United States Patent
Liu (10) Patent No.: US 11,272,689 B2
(45) Date of Patent: Mar. 15, 2022

(54) HANDHELD TRANSMITTER OF DOG TRAINING DEVICE AND TRAINING SYSTEM

(71) Applicant: Shanghai Yuansui Technology Co., Ltd., Shanghai (CN)

(72) Inventor: Qiong Liu, Shanghai (CN)

(73) Assignee: SHANGHAI YUANSUI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/899,963

(22) Filed: Jun. 12, 2020

(65) Prior Publication Data
US 2020/0390062 A1 Dec. 17, 2020

(30) Foreign Application Priority Data
Jun. 17, 2019 (CN) .......................... 201910523376.3

(51) Int. Cl.
G09G 3/14 (2006.01)
A01K 15/02 (2006.01)
G09G 3/18 (2006.01)

(52) U.S. Cl.
CPC ............ *A01K 15/021* (2013.01); *G09G 3/14* (2013.01); *G09G 3/18* (2013.01); *G09G 2354/00* (2013.01)

(58) Field of Classification Search
CPC .. A01K 15/021; A01K 27/009; A01K 29/005; G09G 2354/00; G09G 3/14; G09G 3/18; G01S 19/16; G06K 19/06103; H04L 67/12; H04L 67/18
See application file for complete search history.

(56) References Cited

U.S. PATENT DOCUMENTS

| | | | |
|---|---|---|---|
| 2007/0191913 A1* | 8/2007 | Kim ..................... | A01K 15/021 607/60 |
| 2015/0122199 A1* | 5/2015 | Koplin ................. | A01K 15/021 119/718 |
| 2016/0015004 A1* | 1/2016 | Bonge, Jr. ............... | G01S 19/16 119/718 |
| 2016/0110552 A1* | 4/2016 | Tea ................... | G06K 19/06103 380/246 |
| 2017/0208775 A1* | 7/2017 | Van Curen ........... | A01K 15/021 |
| 2018/0184618 A1* | 7/2018 | Gotts ...................... | H04L 67/18 |
| 2018/0365962 A1* | 12/2018 | Kusakawa .............. | H04L 67/12 |
| 2019/0104707 A1* | 4/2019 | Gotts ................... | A01K 27/009 |
| 2020/0267936 A1* | 8/2020 | Tran ..................... | A01K 29/005 |

* cited by examiner

*Primary Examiner* — Richard J Hong (57) ABSTRACT

A handheld transmitter of dog training device and a training system are disclosed. The handheld transmitter of dog training device comprises a controller and a sensory feedback module, at least one training mode execution keypad, and at least one training intensity adjustment device. A virtual keypad is introduced to change the working state of the selected training mode; in particular, to turn on/off the selected training mode in a channel. The original keypads continue to retain their original functions. Introduction of the virtual keypad does not increase the number of physical keypads, but increases the function of the training device, and reduces the cost.

16 Claims, 4 Drawing Sheets

HANDHELD TRANSMITTER OF DOG TRAINING DEVICE AND TRAINING SYSTEM

CROSS REFERENCE OF RELATED APPLICATIONS

This application claims foreign priority of Chinese Patent Application No. 201910523376.3, filed Jun. 17, 2019, in the China National Intellectual Property Administration, the entire contents of which are incorporated herein in their entirety.

TECHNICAL FIELD

The disclosure relates to the technical field of dog training devices, in particular to a handheld transmitter of dog training device and a training system.

BACKGROUND

Dogs are friends of human beings. For scientifically and effectively training of dogs, a dog training device is usually used to assist dog training. Dog owner using a handheld transmitter transmits various commands of training mode to a receiver, and the receiver implements training stimulation to the dogs to be trained, according to the signals received.

Some training mode, such as static shock stimulation, are more irritating to dogs, and should avoid being used frequently. But this training mode is also kept for use when necessary. During the usage or carrying of handheld transmitter of the dog training device, it is inevitable that the keypad that sends static shock command sometimes is accidentally touched to cause incorrect operation, which will cause a false stimulation to the dog and cause training failure. Therefore, it is necessary to add a switching device to allow the dog owner to flexibly choose to use these training modes, which is equivalent to requiring an increase in the function of the operation interface.

As a low-cost product, the dog training device is required to be low cost, effectiveness, and reliability for the producer. Adding a component is not just an increase of cost of a component, it will bring about a series of related expenses, and reduce reliability. For users, the operation interface is required to be simple and easy to use, and the keypad configuration should not be too crowded. The handheld transmitter of the dog training device is a handheld device, which is required to be small size and easy to carry, and the number of operating keypads should not be too many or too complicated. At the same time, for the producer, because of the limit of cost and size, it is also desirable to limit the number of keypads. But the number limitation of keypads will reduce the number of functions available on the operation interface.

SUMMARY

Aiming at the problem that the handheld transmitter of dog training device requires a limited number of keypads and at the same time increasing the functions of the operation interface, the present disclosure provides a handheld transmitter of dog training device, which does not increase the number of keypads while increases the operation function.

Another problem to be solved by the present disclosure is to provide a training system comprising the above-mentioned handheld transmitter of dog training device.

To solve the problems of the prior art, the present disclosure provides a handheld transmitter of dog training device.

The handheld transmitter of dog training device comprises a controller, a sensory feedback module electrically connected to said controller, at least one training mode execution device and at least one training intensity adjustment device, wherein: the controller is configured to perform the following steps to adjust and switch the selected training mode and training intensity:

pre-arranging the first redundant code in the training intensity sequence of the selected training mode;

providing that the training intensity of the selected training mode is the first redundant code; when detecting that the training intensity is executed by the training mode execution device, the state where the training intensity of the selected training mode is the first redundant code is switched to the first working state of the selected training mode, and the first working state indicator for the selected training mode is turned on as the start flag for the first working state;

when detecting that said training mode execution device is activated under the first working state of the selected training mode, the selected training mode state is switched from the first working state to the second working state of the selected training mode, and the second working state indicator for the selected training mode is turned on as the start flag for the second working state, and the first working state indicator for the selected training mode is turned off to indicate the end of the first working state.

From the state where the training intensity is the state of the first redundant code to the first working state of the selected training mode, and then to the second working state of the selected training mode, all states are switched through the training mode execution device. The controller can determine the state after the activation of the training mode execution device by the state before the activation of the mode execution device.

The training mode execution device is generally in the form of keypad or button.

The handheld transmitter can also comprise at least one training mode selection keypad for mode switch of different training modes. The training mode selection keypad and training mode execution keypad can be combined into one keypad, or they can be set separately.

The entire operation process is equivalent to adding a virtual keypad. The introduction of virtual keypad is functionally equivalent to increasing the number of keypads, thereby increasing the functions of the operation interface, but without the increase of physical keypads, which saves the number of keypads to the greatest extent. Multiple virtual keypads can be added in multiple training modes to save multiple physical keypads.

Preferably, by the training intensity adjustment device, mutual switching between the first redundant code and the valid training intensity is achieved in the selected training mode.

Preferably, the valid training intensity and the first redundant code are arranged in the end-around manner.

Generally, the valid training intensity is a sequence of natural numbers from 1 to N. The first redundant code is inserted before the starting number, for example, the first redundant code is set to be 0, or after the last number, for example, N+1, to form a number sequence arranged end to end in an end-around manner. Under the action of the controller, the cycle scroll code selection can be realized through the training intensity adjustment keypad. For example, the first redundant code is set to be 0; pressing the training intensity increase adjustment keypad, the intensity will be increased from 1 to N in sequence. When the intensity reaches N and is then increased by 1, the intensity will be 0; and when the intensity is 0 and is then increased, the intensity will be 1. Accordingly, cycle scroll code selection is realized. In some embodiments, it is not excluded that 0 can also be set as a valid training intensity. In this embodiment, the first redundancy code may be set to be a non-zero value.

Preferably, the first working state of the selected training mode is that the selected training mode is in an off state.

Preferably, the second working state of the selected training mode is the state where the training intensity of the selected training mode is the first redundant code.

Preferably, the first redundant code is 0.

The first redundancy code may also be other identifiers.

Preferably, the sensory feedback module is a device with visual or audible feedback.

Audible feedback can be achieved through acoustic components such as a buzzer.

Preferably, the sensory feedback module is LCD or LED display or the numbers on a dial.

LCD is liquid crystal display.

Preferably, when the training intensity is the first redundant code and the first redundant code is 0, the LCD shows that the training intensity of the selected training mode is 0.

Preferably, the first working state of the selected training mode is the off state of the selected training mode, the first working state indicator for the selected training mode is realized by LCD; the LCD shows that the training intensity of the selected training mode is OFF.

Preferably, when the training intensity of the selected training mode is 0, the LCD shows that the training intensity of the selected training mode is 0; when detecting that said training mode execution device executes the training intensity of the selected training mode for the first set time, the state where the training intensity of the selected training mode is 0 is switched to the off state of the selected training mode; and the LCD shows that the training intensity of the selected training mode is OFF.

Preferably, when the selected training mode is the off state, the LCD shows that the training intensity of the selected training mode is OFF; when detecting that said training mode execution device is activated for the second set time, the selected training mode is switched from the off state to the state where the training intensity is 0.

Preferably, the sensory feedback module is the numbers on the dial, and the training intensity adjustment device is the dial with numbers; when the training intensity is the first redundant code, the dial with numbers is tuned to 0 or the state with the adaptation mark. Preferably, the first working state of the selected training mode is the state where the selected training mode is off; the first working state indicator of the selected training mode is realized by state change of a configured LED; when the first working state of the selected training mode is started, the configured LED is in the first configuration state; when the first working state of the selected training mode is off, the configured LED is in the second configuration state; wherein the first configuration state and the second configuration state are different.

Preferably, mutual switching between the state where the training intensity of the selected training mode is the first redundant code and the first working state of the selected training mode is achieved by means of activating said training mode execution device for the third set time.

Preferably, the steps further comprises:

when the training intensity increases, obtaining an initial intensity $I_0$, a finally selected intensity $I_M$ and a change period t from the initial intensity $I_0$ to the finally selected intensity $I_M$;

generating a weighted change speed v according to the initial intensity $I_0$, the finally selected intensity $I_M$ and the change period t;

where $v=f(I_M)*(I_M-I_0-1)/t$;

where $f(I_M)$ is a function of $I_M$ and positively related to $I_M$;

when the weighted change speed is greater than a preset threshold, generating a delay time for each intensity change, so that each intensity change takes effect after reaching the delay time;

when detecting an operation to reduce the intensity within the delay time, the instruction to increase the intensity that has not yet taken effect is cancelled.

The present disclosure also provides a training system comprising a receiver and a handheld transmitter; the handheld transmitter and the receiver are interconnected and communicated through a wired or wireless manner.

The beneficial effects of the present disclosure are as follows.

The present disclosure proposes a handheld transmitter for the dog training device and a training system. The handheld transmitter of dog training device does not increase the existing number of physical keypads. Under the action of the controller, the physical keypads and software are combined to bring the effect of increasing the physical keys without increasing the actual number of physical keypads, so as to increase the function of the operation interface, maintain the small size of the handheld transmitter, provide convenience for the design and manufacturing of the handheld transmitter, reduce costs for producers, and provide users with more product features, more flexible and rich operating experience.

In the drawings: 1—handheld transmitter of dog training device, 2—receiver, 3—LCD screen, 3A—first display area on the LCD screen for displaying the current training mode, 3B—second display area on LCD screen for displaying the current training intensity of the selected training mode, 4—training mode execution keypad, 5—training mode execution keypad, 6—training mode execution keypad, 7—training intensity adjustment keypad (training intensity increase keypad), 8—training intensity adjustment keypad (training intensity decrease keypad), 9—training mode selection keypad, 10—training mode execution keypad, 11—dial with numbers, 11A—selection pointer of the dial, 12—indicator of configured LED.

DETAILED DESCRIPTION OF THE EMBODIMENTS

The disclosure is further described below with reference to the drawings and embodiments.

Figure 1:
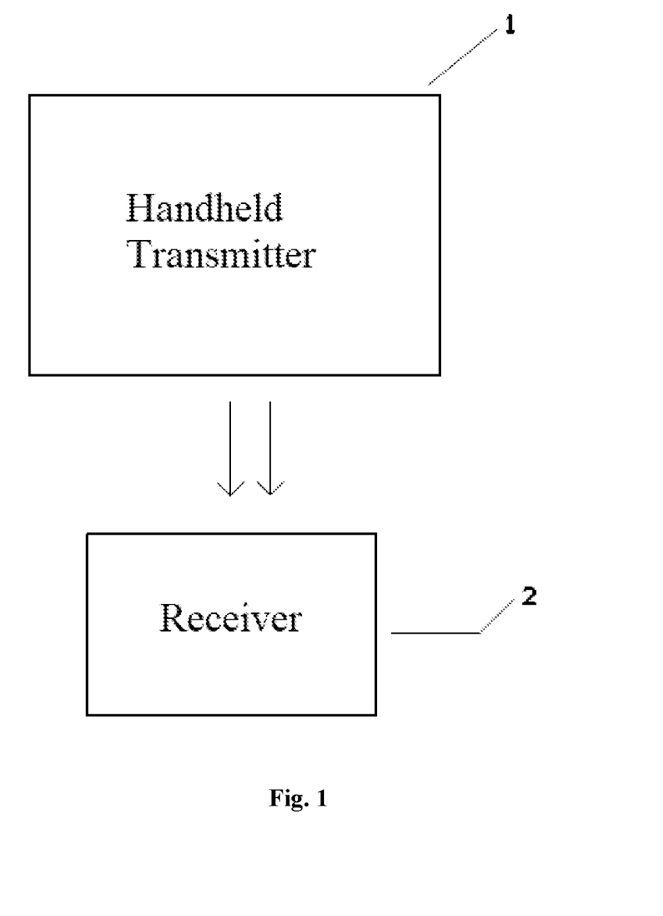
FIG. 1 is a schematic diagram of a training system according to the first embodiment of the present disclosure.

Referring to FIG. 1, the first embodiment of the present disclosure provides a training system, which comprises a handheld transmitter of dog training device 1 and a receiver 2 adapted to be worn on a dog to be trained, wherein communication connection between the handheld transmitter of dog training device 1 and the receiver 2 may be performed in a wired or wireless manner; and based on the connection, the handheld transmitter of dog training device 1 may send corresponding training commands to the receiver 2 so that the dogs are trained by the receiver 2.

Wherein, under normal circumstances, the handheld transmitter of dog training device 1 and the receiver 2 are connected by means of wireless communication, for example, data transmission may be performed by 150 MHz, 315 MHz, 433 MHz and 800 MHz, etc. wireless radio wave. Of course, it should be understood that, in the embodiments of the present disclosure, other wireless transmission methods may also be used, such as Wi-Fi, Bluetooth, 2G/3G/4G, and the like, and the present disclosure does not specifically limit them.

In this embodiment, the handheld transmitter of dog training device 1 may comprise a controller, a sensory feedback module electrically connected to the controller, at least one training mode execution device, and at least one training intensity adjustment device. The user may implement sending of training commands and adjusting of training commands by the training mode execution device, training mode selection keypad and training intensity adjustment device, such as switching between different training modes or adjusting the training intensity of the training mode, etc. At the same time, the training mode or training intensity selected by the user can be feed backed through the sensory feedback module, so that the user understands the current training mode and training intensity.

Wherein, in this embodiment, the training mode execution device is generally presented as keypad or button, and the training intensity adjustment device may be presented in the form of keypad, knob, or dial, which is not specifically limited in the present disclosure.

Wherein, in this embodiment, the sensory feedback module is a device with visual or audible feedback. For example, the sensory feedback module, which can be set according to specific needs, may be LCD (liquid crystal display) or LED display or the numbers on the dial. It is not specifically limited in the disclosure.

In this embodiment, the controller may be used to implement the following functions:

S101, the first redundant code is arranged in the training intensity sequence of the selected training mode in advance.

Wherein, the training intensity sequence of each training mode includes at least one valid training intensity, for example, 1, 2, 3, 4, 5, etc. The user can adjust different training intensity through the training intensity adjustment device. In this embodiment, the first redundant code is inserted in the training intensity sequence, which is different from the valid training intensity. When the training intensity is the first redundant code, the handheld transmitter of dog training device 1 is still in working condition, but no training command is sent to the receiver 2.

S102, providing that the training intensity of the selected training mode is the first redundant code; when detecting that under the training intensity the training mode execution device executes, the state where the training intensity of the selected training mode is the first redundant code is switched to the first working state of the selected training mode, and the first working state indicator for the selected training mode is turned on as the start flag of the first working state.

The first working state of the selected training mode is the off state of the selected training mode.

S103, when detecting that the training mode execution device is activated under the first working state of the selected training mode, the selected training mode state is switched from the first working state to the second working state of the selected training mode, and the second working state indicator for the selected training mode is turned on as the start flag of the second working state; and the first working state indicator for the selected training mode is turned off to indicate the end of the first working state.

The second working state of the selected training mode is the state where the training intensity of the selected training mode is the first redundant code.

Wherein, in this embodiment, when the training intensity is the first redundant code, the user can execute state switch between different working states by operating the training mode execution device. For example, the training mode execution device is a training mode execution keypad. The state where the training intensity is the first redundant code can be switched to the off state of the selected training mode by long pressing the training mode execution keypad. Likewise, the off state of the selected training mode can be switched back to the state where the training intensity is the first redundant code by long pressing the training mode execution keypad.

As described above, in this embodiment, the handheld transmitter of the dog training device 1 does not increase the existing number of physical keypads. Equivalent to adding virtual keypad, under the action of the controller, the physical keypads and software are combined to bring the effect of increasing the physical keys without increasing the actual number of physical keypads, so as to increase the function of the operation interface, maintain the small size of the handheld transmitter, provide convenience for the design and manufacturing of the handheld transmitter, reduce costs for producers, and provide users with more product features, more flexible and rich operating experience.

Further, in the present embodiment, after the switching process from the state where the training intensity is the first redundant code to the off state of the selected training mode, the selected training mode is in the off state. The training intensity adjustment device has no effect. The handheld transmitter of dog training device 1 will not send training commands to the receiver 2. After the off state of the selected training mode switching back to the normal training intensity sequence of the selected training mode, that is, the state where the training intensity is the first redundant code, the handheld transmitter of dog training device 1 also will not send commands to the receiver 2. So whether the training intensity is the first redundant code, the selected training mode is the off state, or during the mutual switching between the state where the training intensity is the first redundant code and the first working state of the selected training mode, the handheld transmitter of dog training device 1 will not send training commands to receiver 2. Accordingly, it is feasible to avoid sending wrong information from the handheld transmitter of dog training device 1 caused by the accident working state change.

In order to facilitate the understanding of the present disclosure, the structure and working principle of the handheld transmitter of dog training device 1 of the present disclosure will be described in the following embodiments.

Figure 2:
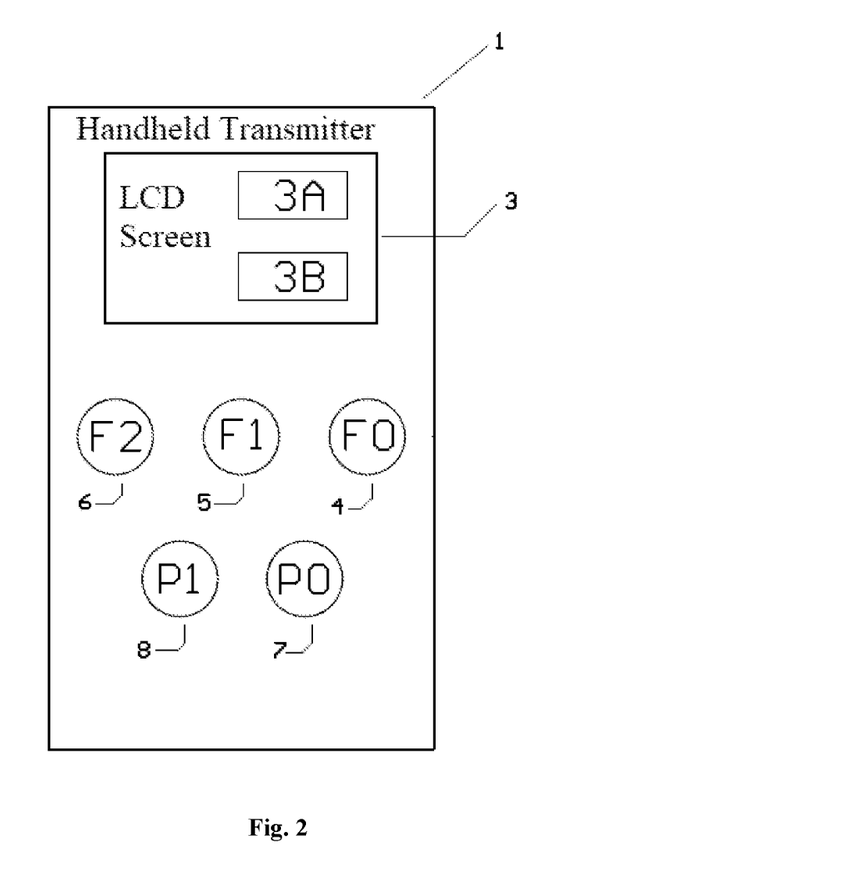
FIG. 2 is a schematic diagram of a handheld transmitter of dog training device according to the second embodiment of the present disclosure.

FIG. 2 is a schematic diagram of a handheld transmitter of dog training device according to the second embodiment of the present disclosure.

In this embodiment, the sensory feedback module of the handheld transmitter of dog training device 1 is set to the LCD screen 3. The LCD screen 3 has a first display area 3A on the LCD screen for displaying the current training mode, and a second display area 3B on the LCD screen for displaying the current training intensity of the selected training mode.

Further, in this embodiment, the training mode execution device is presented in the form of keypad, where keypads 4, 5, 6 represent different training modes. Each keypad may function as both a training mode execution keypad and a training mode selection keypad. The training mode execution keypad 4 is both the execution keypad and the selection keypad of F0 mode. The second training mode execution keypad 5 is both the execution keypad and the selection keypad of F1 mode. The third training mode execution keypad 6 is both the execution keypad and the selection keypad of F2 mode. The F0, F1 and F2 mode can be arbitrarily set according to requirements. For example, executing the F2 mode is set to send static shock stimulations command to receiver.

Further, in this embodiment, the training intensity adjustment device may include the first training intensity adjustment keypad 7 and the second training intensity adjustment keypad 8; wherein the first training intensity adjustment keypad 7 executes intensity increase adjustment and the second training intensity adjustment keypad 8 executes intensity decrease adjustment. The first redundant code is set to 0. The training intensity sequence can be set as 0 to 10, arranged in end-around manner. The valid training intensity is 1 to 10, the initial training intensity is set to be 1, and the second display area 3B on LCD screen for displaying the current training intensity of the selected training mode shows that the current training intensity of the selected training mode is 1. The first display area 3A on the LCD screen for displaying the current training mode shows that the current training mode is static shock stimulation F2.

Further, in this embodiment, the controller is disposed inside the handheld transmitter of dog training device 1 and generally includes an IC chip with CPU, and the IC chip is electrically connected to each keypad and the LCD screen 3 to implement reception and transmission of various data or instructions, so as to achieve various functions of the handheld transmitter of dog training device 1.

At this time, if the third training mode execution keypad 6 is pressed, the F2 mode is selected and executed, with the initial training intensity being 1. When it is desired to turn off the F2 mode, firstly increasing intensity with the first training intensity adjustment keypad 7 or decreasing intensity with the second training intensity adjustment keypad 8 to adjust the training intensity to the first redundant code 0, and the second display area 3B on LCD screen for displaying the current training intensity of the selected training mode displays the current intensity of the selected training mode is 0. Pressing down the third training mode execution key 6 and keeping the state for a set time, such as 10 seconds, the controller detects this situation; the state where the training intensity of the selected training mode F2 is 0 is switched to the off state of the selected training mode F2, which realizes the state where the training intensity of the selected training mode F2 is the first redundant code 0 is switched to the first working state of the selected training mode F2 (training mode F2 is off), and the second display area 3B on LCD screen for displaying the current training intensity of the selected training mode displays the training intensity of the selected training mode F2 is OFF. It prompts the user that the current training mode F2 has been turned off. Generally, the time for pressing the third training mode execution keypad 6 caused by misoperation is short, such as no more than 2 seconds. When the selected training mode F2 is off, regardless of pressing or touching the third training mode execution keypad 6 for a short time, or pressing the first training intensity adjustment keypad 7 and the second training intensity adjustment keypad 8, the controller will not do anything about F2 mode, so as to prevent the F2 mode from being executed by mistake. When you need to turn on the F2 mode again, you can set the opening conditions according to your needs and choose different execution methods for the training mode execution keypad. The simple way is to press the third training mode execution keypad 6 and keep the state for the set time, such as 10 seconds; the controller detects this situation, the first working state of the selected training mode F2 (training mode F2 is off) is switched to the second working state of the selected training mode F2 (the training intensity of the selected training mode F2 is the first redundant code 0). At this time, the second display area 3B on the LCD screen for displaying the current training intensity of the selected training mode shows that the training intensity of the selected training mode F2 is changed from OFF to 0. The second working state of the selected training mode is reached. That is, the state where the training intensity is 0 in the selected training mode F2. Then, the first training intensity adjustment keypad 7 is used to increase intensity adjustment, or the second training intensity adjustment keypad 8 is used to decrease intensity adjustment, and the training intensity is adjusted to the required valid training intensity in the selected training mode F2. The whole process is equivalent to adding a virtual keypad for switching on/off the training mode F2. According to the requirements, other modes, such as the F0 mode or the F1 mode can be similarly processed. The training modes under other different training channels can also be processed similarly.

Figure 3:
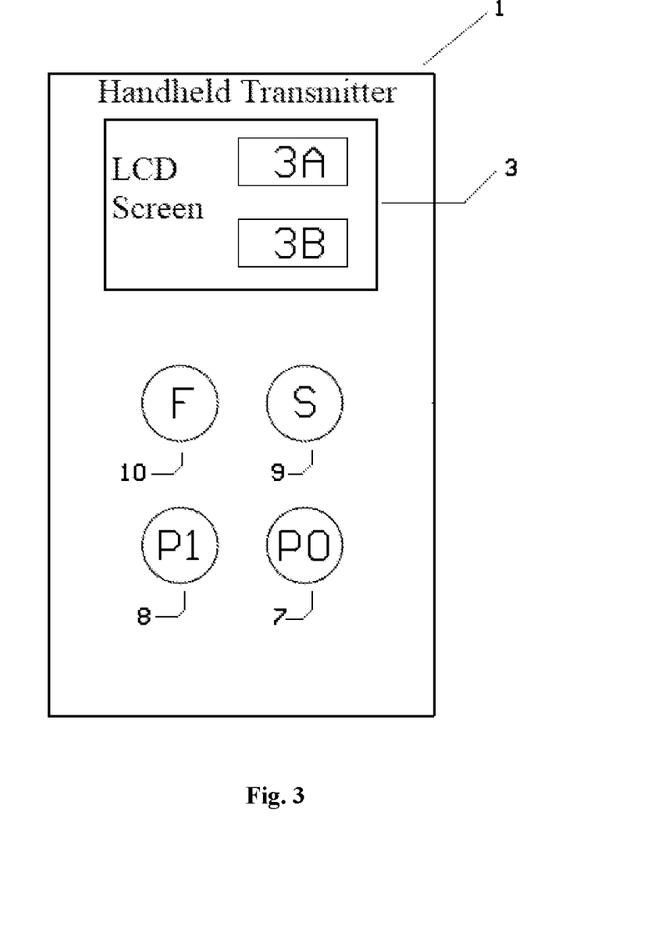
FIG. 3 is a schematic diagram of a handheld transmitter of dog training device according to the third embodiment of the present disclosure.

FIG. 3 is a schematic diagram of a handheld transmitter of dog training device 1 according to the third embodiment of the present disclosure.

Different from the second embodiment, the training mode selection keypad and the training mode execution keypad of this embodiment are separately provided. The handheld transmitter of dog training device 1 also has the same the function of as in the second embodiment; and select a mode among training mode F0, F1, F2 by clicking on the training mode selection key 9, such as selecting F2 as a result. At this time, the first display area 3A on the LCD screen for displaying the current training mode shows that the current training mode is F2, and the second display area 3B on the LCD screen for displaying the current training intensity of the selected training mode shows the current training intensity of the selected training mode F2. The first redundant code is set to 0. The training intensity sequence is set as 0 to 10, and is arranged in end-around manner. The valid training intensity is 1 to 10, the initial training intensity is set to 1, and the second display area 3B on the LCD screen for displaying the current training intensity of the selected training mode shows that the current training intensity of the selected training mode is 1. The first display area 3A on the LCD screen for displaying the current training mode shows that the current training mode is static shock stimulation F2. Pressing the training mode execution keypad 10 brings to executing the F2 mode, and the training intensity is 1. When it is desired to turn off the F2 mode, firstly increasing the training intensity through the first training intensity adjustment keypad 7 or decreasing the training intensity with the second training intensity adjustment keypad 8 to adjust the training intensity to 0, and the second display area 3B on the LCD screen for displaying the current training intensity of the selected training mode displays the current training intensity of the selected training mode is 0. Pressing down the training mode execution key 10 and keeping the state for a set time, such as 10 seconds, the controller detects this situation, and the state where the training intensity of the selected training mode F2 is 0 is switched to the off state of the selected training mode F2, which realizes the state where the training intensity of the selected training mode F2 is the first redundant code 0 is switched to the first working state of the selected training mode F2 (training mode F2 is off), and the second display area 3B on the LCD screen for displaying the current training intensity of the selected training mode displays the training intensity of the selected training mode F2 is OFF. It prompts the user that the current training mode F2 has been turned off. Generally, the time for pressing the training mode execution keypad 10 caused by misoperation is short, such as no more than 2 seconds. When the selected training mode F2 is off, in spite of pressing or touching the training mode execution keypad 10 for a short time, or pressing the first training intensity adjustment keypad 7 and the second training intensity adjustment keypad 8, the controller chooses not to execute the F2 mode, so as to prevent the F2 mode from being executed by mistake.

When you need to turn on the F2 mode again, you can set the opening conditions according to your needs and choose different execution methods for the training mode execution keypad 10.

The simple way is to press the training mode execution keypad 10 and keep the state for a set time, such as 10 seconds, the controller detects this situation, the first working state of the selected training mode F2 (training mode F2 is off) is switched to the second working state of the selected training mode F2 (the training intensity of the selected training mode F2 is the first redundant code 0). At this time, the second display area 3B on the LCD screen for displaying the current training intensity of the selected training mode shows that the training intensity of the selected training mode F2 is changed from OFF to 0. The second working state of the selected training mode is reached. That is, the state where the training intensity is 0 in the selected training mode F2. Then, the first training intensity adjustment keypad 7 is used to increase intensity adjustment, or the second training intensity adjustment keypad 8 is used to decrease intensity adjustment, and the training intensity is adjusted to the required valid training intensity in the selected training mode F2. The whole process is equivalent to adding a virtual keypad for switching on/off the training mode F2. According to the requirements, other modes, such as the F0 mode or the F1 mode can be similarly processed. The training modes under other different training channels can also be processed similarly.

Figure 4:
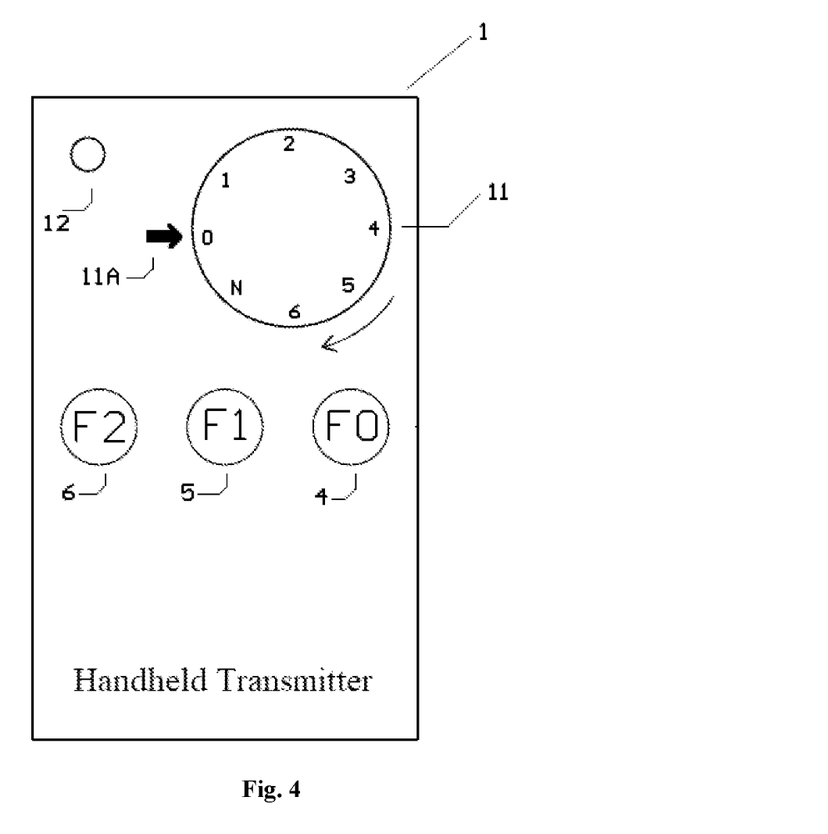
FIG. 4 is a schematic diagram of a handheld transmitter of dog training device according to the fourth embodiment of the present disclosure.

FIG. 4 is a schematic diagram of a handheld transmitter of dog training device 1 according to the fourth embodiment of the present disclosure. Different from the second embodiment, in the present embodiment, the training intensity adjustment device is a dial with numbers 11, and indicator of configured LED 12 is arranged to indicate different operating state. The dial number indicated by the selection pointer of the dial 11A of the dial with numbers 11 is the current training intensity of the selected training mode. Keypad 4, 5 and 6 each is both the training mode execution keypad and the training mode selection keypad. The first training mode execution keypad 4 selects and executes the F0 mode, the second training mode execution keypad 5 selects and executes the F1 mode, and the third training mode execution keypad 6 selects and executes the F2 mode. The F0, F1 and F2 modes can be arbitrarily set according to requirements. For example, executing the F2 mode is set to send static shock stimulation command to receiver. The training intensity can be adjusted by turning the dial with numbers 11. The first redundant code is set to 0. The training intensity sequence is set as 0 to 10, the valid training intensity is 1 to 10, the initial training intensity is set to 1, and the dial number indicated by the selection pointer of the dial 11A is 1. The indicator of configured LED 12 is initially off and in the first configuration state. Pressing the third training mode execution keypad 6 brings to selecting and executing the F2 mode with the intensity being 1. When it is desired to close F2 mode, firstly adjusting the training intensity to 0 by rotating the dial with numbers 11, and the dial number indicated by the selection pointer of the dial 11A is 0. Pressing down the training mode execution key 6 and keeping the state for a set time, such as 10 seconds, the controller detects this situation; the state where the training intensity of the selected training mode F2 is 0 is switched to the off state of the selected training mode F2, which realizes the state where the training intensity of the selected training mode F2 is the first redundant code 0 is switched to the first working state of the selected training mode F2 (training mode F2 is off), and at this time the indicator of configured LED 12 is on and in the second configuration state. It prompts the user that the current training mode F2 has been turned off.

Generally, the time for pressing the third training mode execution keypad 6 caused by misoperation is short, such as no more than 2 seconds.

When the selected training mode F2 is off, in spite of pressing the third training mode execution keypad 6 for a short time, the controller chooses not to execute the F2 mode, so as to prevent the F2 mode from being executed by mistake.

When you need to turn on the F2 mode again, you can set the opening conditions according to your needs and choose different execution methods for the third training mode execution keypad 6.

The simple way is to press the third training mode execution keypad 6 and keep the state for the set time, such as 10 seconds; the controller detects this situation, the first working state of the selected training mode F2 (training mode F2 is off) is switched to the second working state of the selected training mode F2 (the training intensity of the selected training mode F2 is the first redundant code 0). At this time, the indicator of the configured LED 12 is off again, and is in the first configuration state. The second working state of the selected training mode is reached, that is, the state where the training intensity is 0 in the selected training mode F2. Then, by rotating the dial with numbers 11, the training intensity is adjusted to the desired valid training intensity in the selected training mode F2. The whole process is equivalent to adding a virtual keypad for switching on/off the training mode F2.

According to the requirements, other function keypads, such as the first training mode execution keypad 4 for executing the F0 mode, and the second training mode execution keypad 5 for executing the F1 mode can be similarly processed. The training modes under other different training channels can also be processed similarly.

To increase the product intelligence to prevent certain degree of damage to the dog being trained, in case of some specific occasions, such that the user, not familiar with the product, for the first time contacting with the product, incorrectly and excessively use of F2, leading to a rapid increase in the intensity of the training mode. For this end, it is desired to provide an optional solution:

the controller also performs the following operations:

when the training intensity increases, obtaining the initial intensity $I_0$, the finally selected intensity $I_M$, and the change period t from the initial intensity $I_0$ to the finally selected intensity $I_M$;

generating a weighted change speed v according to $I_0$, $I_M$ and t;

where $v=f(I_M)*(I_M-I_0-1)/t$; where $f(I_M)$ is a function of $I_M$, and positively related to $I_M$;

when the weighted change speed is greater than a preset threshold, generating a delay time for each intensity change, so that each intensity change takes effect after reaching the delay time;

when an operation to reduce the intensity is detected within the delay time, the instruction to increase the intensity that has not yet taken effect is cancelled.

In this embodiment, when the controller detects a rapid change in the intensity of F2, a delay time is set. This delay time will make the intensity change not to take effect immediately. In this way, the user has a buffer time to correct errors after a misoperation occurs. For example, reduce the intensity by turning back the dial with numbers 11.

Among them, in this embodiment, a delay time is configured for each change in intensity. For example, if the current intensity rapidly increases from 1 to 6, the intensity from 1 to 2, 2 to 3, 3 to 4, 4 to 5, and 5 to 6 will have a corresponding delay time.

In addition, in this embodiment, if the user performs an operation to reduce the intensity within the delay time, the instruction to increase the intensity that has not yet taken effect will be cancelled. For example, when the intensity is changing from 3 to 4, the user reduce the intensity, and the subsequent intensity change instructions of 4 to 5 and 5 to 6 will be cancelled and not be executed, so as not to cause damage to the dog being trained.

Wherein, in this embodiment, it is considered that the greater the intensity, the greater the damage that may be caused. Therefore, a weighted change rate is used when calculating the change rate. That is, the weighted change rate is not only related to the change period, intensity variation, but also the absolute intensity of the finally selected $I_M$. If the final selected intensity $I_M$ is small, it will not cause harm to the training dog; and if the final selected intensity $I_M$ is relatively large, it is more likely to cause damage to the dog being trained. At this time, the weighted change speed will be increased for protection.

The handheld transmitter and working method of the dog training device described above are only preferred embodiments of the present disclosure, and are not intended to limit the present disclosure. Any modification and equivalent replacement etc. made within the spirit and principle of the present disclosure should all be included in the protection scope of the present disclosure.

What is claimed is:

1. A handheld transmitter of dog training device, the handheld transmitter comprises:
   a controller,
   a sensory feedback module electrically connected to said controller,
   at least one training mode execution device, and
   at least one training intensity adjustment device,
   wherein:
   the controller is configured to perform the following steps to adjust and switch a selected training mode and a training intensity:
   pre-arranging a first redundant code in a training intensity sequence of the selected training mode;
   providing that the training intensity of the selected training mode is the first redundant code; when detecting that the training intensity is executed by the training mode execution device, a state where the training intensity of the selected training mode is the first redundant code is switched to a first working state of the selected training mode, and a first working state indicator for the selected training mode is turned on as a start flag for the first working state;
   when detecting that said training mode execution device is activated under the first working state of the selected training mode, the selected training mode state is switched from the first working state to a second working state of the selected training mode, and a second working state indicator for the selected training mode is turned on as a start flag for the second working state, and the first working state indicator for the selected training mode is turned off to indicate the end of the first working state;
   the first working state of the selected training mode is that the selected training mode is in an off state.

2. The handheld transmitter of claim 1, wherein by said training intensity adjustment device, mutual switching between the first redundant code and the valid training intensity is achieved in the selected training mode.

3. The handheld transmitter of claim 2, wherein the valid training intensity and the first redundant code are arranged in an end-around manner.

4. The handheld transmitter of claim 1, wherein the second working state of the selected training mode is the state where the training intensity of the selected training mode is the first redundant code.

5. The handheld transmitter of claim 1, wherein the first redundant code is 0.

6. The handheld transmitter of claim 1, wherein said sensory feedback module is a device with visual or audible feedback.

7. The handheld transmitter of claim 1, wherein said sensory feedback module is LCD or LED display or the numbers on the dial.

8. The handheld transmitter of claim 7, wherein when the training intensity is the first redundant code and the first redundant code is 0, the LCD shows that the training intensity of the selected training mode is 0.

9. The handheld transmitter of claim 7, wherein the first working state of the selected training mode is the off state of the selected training mode, the first working state indicator for the selected training mode is realized by LCD; the LCD shows that the training intensity of the selected training mode is OFF.

10. The handheld transmitter of claim 7, wherein when the training intensity of the selected training mode is 0, the LCD shows that the training intensity of the selected training mode is 0; when detecting that said training mode execution device executes the training intensity of the selected training mode for a first set time, the state where the training intensity of the selected training mode is 0 is switched to the off state of the selected training mode; and the LCD shows that the training intensity of the selected training mode is OFF.

11. The handheld transmitter of claim 7, wherein when the selected training mode is the off state, the LCD shows that the training intensity of the selected training mode is OFF;

when detecting that said training mode execution device is activated for a second set time, the selected training mode is switched from the off state to the state where the training intensity is 0.

12. The handheld transmitter of claim 7, wherein said sensory feedback module is the numbers on the dial, the training intensity adjustment device is the dial with numbers; when the training intensity is the first redundant code, the dial with numbers is tuned to 0 or the state with an adaptation mark.

13. The handheld transmitter of claim 7, wherein the first working state of the selected training mode is the state where the selected training mode is off; the first working state indicator of the selected training mode is realized by state change of a configured LED;
when the first working state of the selected training mode is started, the configured LED is in a first configuration state;
when the first working state of the selected training mode is off, the configured LED is in a second configuration state; wherein the first configuration state and the second configuration state are different.

14. The handheld transmitter of claim 1, wherein mutual switching between the state where the training intensity of the selected training mode is the first redundant code and the first working state of the selected training mode is achieved by means of activating said training mode execution device for a third set time.

15. The handheld transmitter of claim 1, further comprising:
when the training intensity increases, obtaining an initial intensity $I_0$, a finally selected intensity $I_M$ and a change period t from the initial intensity $I_0$ to the finally selected intensity $I_M$;
generating a weighted change speed v according to the initial intensity $I_0$, the finally selected intensity $I_M$ and the change period t;
where $v=f(I_M)*(I_M-I_0-1)/t$;
where $f(I_M)$ is a function of $I_M$ and positively related to $I_M$;
when the weighted change speed is greater than a preset threshold, generating a delay time for each intensity change, so that each intensity change takes effect after reaching the delay time;
when detecting an operation to reduce the intensity within the delay time, the instruction to increase the intensity that has not yet taken effect is cancelled.

16. A training system, comprising a receiver and a handheld transmitter as claimed in claim 1; the handheld transmitter and the receiver are communicated through a wired or wireless manner.

* * * * *